May 26, 1931.　　　　F. S. HINES　　　　1,807,313
WEIGHING ATTACHMENT FOR MEAT SLICERS
Filed May 24, 1928

INVENTOR.
Frank S. Hines
BY David E. Carlsen
ATTORNEY

Patented May 26, 1931

1,807,313

UNITED STATES PATENT OFFICE

FRANK S. HINES, OF NORTHFIELD, MINNESOTA

WEIGHING ATTACHMENT FOR MEAT SLICERS

Application filed May 24, 1928. Serial No. 280,211.

My invention relates to a new and useful combination pertaining to meat slicing machines and the main object of the invention is to provide a weighing device for such machines and which indicates weight and price of meat simultaneously.

Further objects and features of the invention are hereinafter set forth reference being had to the accompanying drawings, in which,—

Figure 1:
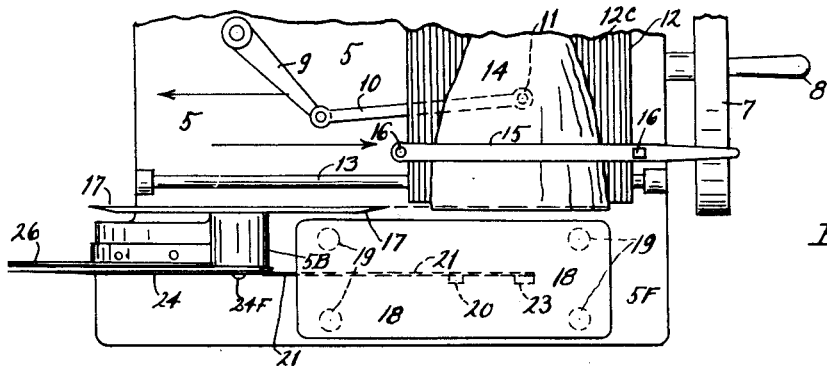
Fig. 1 is a top or plan view of the front portion of a meat slicing machine embodying one form of my weighing device.

Referring to the drawings by reference numerals, I will first describe the slicing machine for the purpose of subsequently more readily revealing the mounting and operation of my improvements.

5 designates a slicing machine main-frame usually of cast metal and having a flat base part adapted to rest on a table 6. 7 is a fly wheel exteriorly of said base having a handle 8 for rotating it and also cause rotation of a crank arm 9 pivotally connected to a connecting rod 10 which in turn is pivotally connected as at 11 to the under side of a reciprocable meat carriage 12 which reciprocates on suitable parallel rails 13. Said carriage is usually provided with corrugations 12C extending transversely of the direction of movement of the carriage. A chunk of meat 14 to be sliced is laid on the carriage and overlapping the front edge of the latter (see Fig. 1). 15 is a normally horizontal bar suitably engaging two vertical posts 16 on the carriage and arranged to bear down frictionally on top of the meat to hold it in place.

17 is a disc-type knife blade mounted rotatably in a vertical plane just forward of the front edge of the carriage 12 it being readily understood that the said disc knife or cutter is rotated by any suitable rotation means (not shown) set into motion when wheel 7 is rotated, the chunk of meat engaging the cutter and being thus sliced by the knife as the carriage reciprocates past the cutting edge. It is well known that in this type of slicing machine various mechanical means are used for feeding the meat forward after each cut so that for each reciprocating movement they cause the knife to cut off a slice of uniform thickness.

Figure 2:
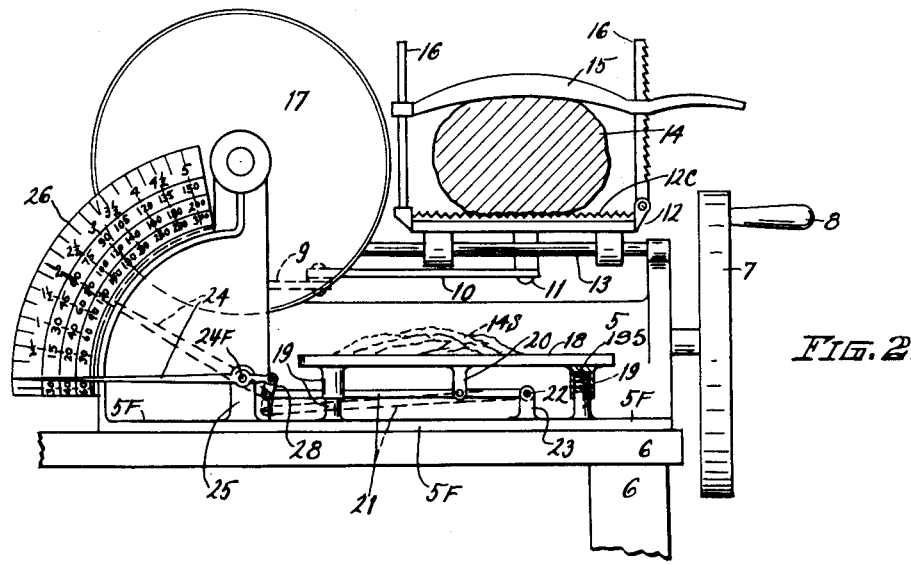
Fig. 2 is a front elevation of Fig. 1 showing my device more fully and in correct operative position relative to certain parts of the slicing machine.

Said slices of meat, on machines as hitherto designed, simply drop on a tray or other suitable container arranged on the base and just below where the cutting or slicing takes place. In my new device this tray comprises a scale platform 18, suitably mounted in elevated horizontal plane over the forwardly extended base part 5F of the main base 5 and the dotted lines 14S, in Fig. 2, indicates a number of meat slices which have dropped thereon after being sliced off of the main chunk of meat 14 by the rotary cutter 17.

The platform 18 shown is mounted on four telescopic post members 19 within each of which may be provided suitable yielding means preferably a compression coil spring 19S (not shown) and 20 is a fixed lug on the under side of the platform extending down centrally of it. Each lower telescopic member is preferably a fixed vertical projection 5P integral of plate 5F. The lug 20 is pivotally connected to a lever 21 fulcrumed as at 22 to a fixed lug 23 on the base 5F the free end of said bar extending beyond one end of the platform 18 and there suitably connected, as by means of a link 28 to the short arm of an indicator hand 24 fulcrumed at 24F in a post 25 on base 5F. This hand 24 is preferably oscillatable in a vertical plane at the front part of the slicing machine and oscillates over the face of an arcuate dial 26.

On said dial are a number of rows of figures and marks so arranged that the weight and value of the meat on the scale platform is readily read. The said dial may be mounted on the upright part of the slicing machine base in which is the bearing 5B for the shaft 17S of the cutter 17.

I have illustrated, only one form of dial and oscillating hand therefor, as applies to a slicing machine of the general design shown. It is obvious that such machines may vary considerably in size and designs which would govern the design of my device to conform therewith; in some instance for example the dial and hand may be clock-like and fully inclosed but clearly visible to the operator. A feature of my invention is the provision of the scale platform in a place on the slicing machine where it receives the slices of meat and the weight and cost indicating means close to the scale platform, all incorporated in the general slicing machine structure.

This device it will be readily seen, eliminates many steps in any establishment selling sliced meats. Hitherto a butcher with a slicing machine, upon receiving an order cuts a number of slices and carries them to the nearest scale which might be some distance. If the quantity of meat is less than ordered he must cut some more and then make another trip to the scale. On the second trip he may find that he has cut more than required and then he has a number of unsold slices on hand which must be put in a special place such as a refrigerator or they may become too dry or unfit for sale, likely before another order is to be filled. The advantages of having a scale, including weight and cost indicating means for any quantity of slices cut, as above fully described is now fully set forth.

I claim:

The combination of a meat slicing machine of the class described, a scale platform mounted thereon adjacent and under the cutting element of said machines, and indicator means operatively connected with said platform to indicate the weight and value of meat on the platform, said platform mounted in a plane above the forward base part of the slicing machine, downwardly projecting tubular projections integral on the under side of said tray, corresponding posts on said base each arranged to telescopically engage in the bore of one of said platform posts and yieldable means provided within each said tubular projection to resist increasing weight on the platform, a single lever bar fulcrumed to a fixed part of the slicing machine base and its opposite end operatively connected with the hand of the weight indicating device, a pivotal connection between an intermediate part of said bar and a fixed central part of the under side of said platform to depress the bar and operate the indicator hand as described.

In testimony whereof I affix my signature.

FRANK S. HINES.